July 31, 1962 W. L. LEWIS 3,047,251

AERODYNAMIC PROPULSION UNIT

Filed July 14, 1960 4 Sheets-Sheet 1

WILLIAM L. LEWIS
INVENTOR.

BY *Jesb M Roberts*

ATTORNEY

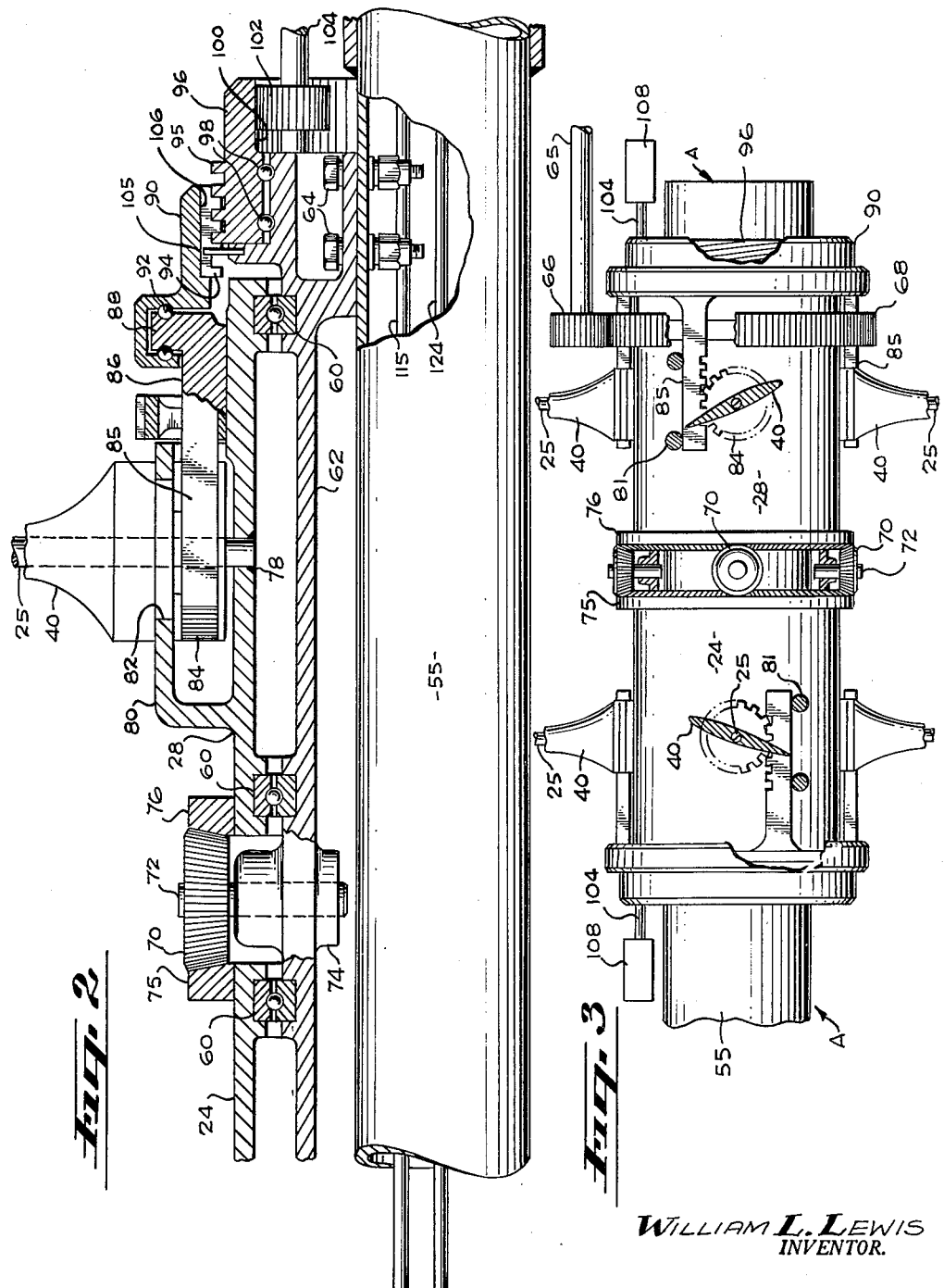

July 31, 1962 W. L. LEWIS 3,047,251
AERODYNAMIC PROPULSION UNIT
Filed July 14, 1960 4 Sheets-Sheet 3

WILLIAM L. LEWIS
INVENTOR.

BY Jesse M. Roberts

ATTORNEY

July 31, 1962 W. L. LEWIS 3,047,251
AERODYNAMIC PROPULSION UNIT
Filed July 14, 1960 4 Sheets-Sheet 4
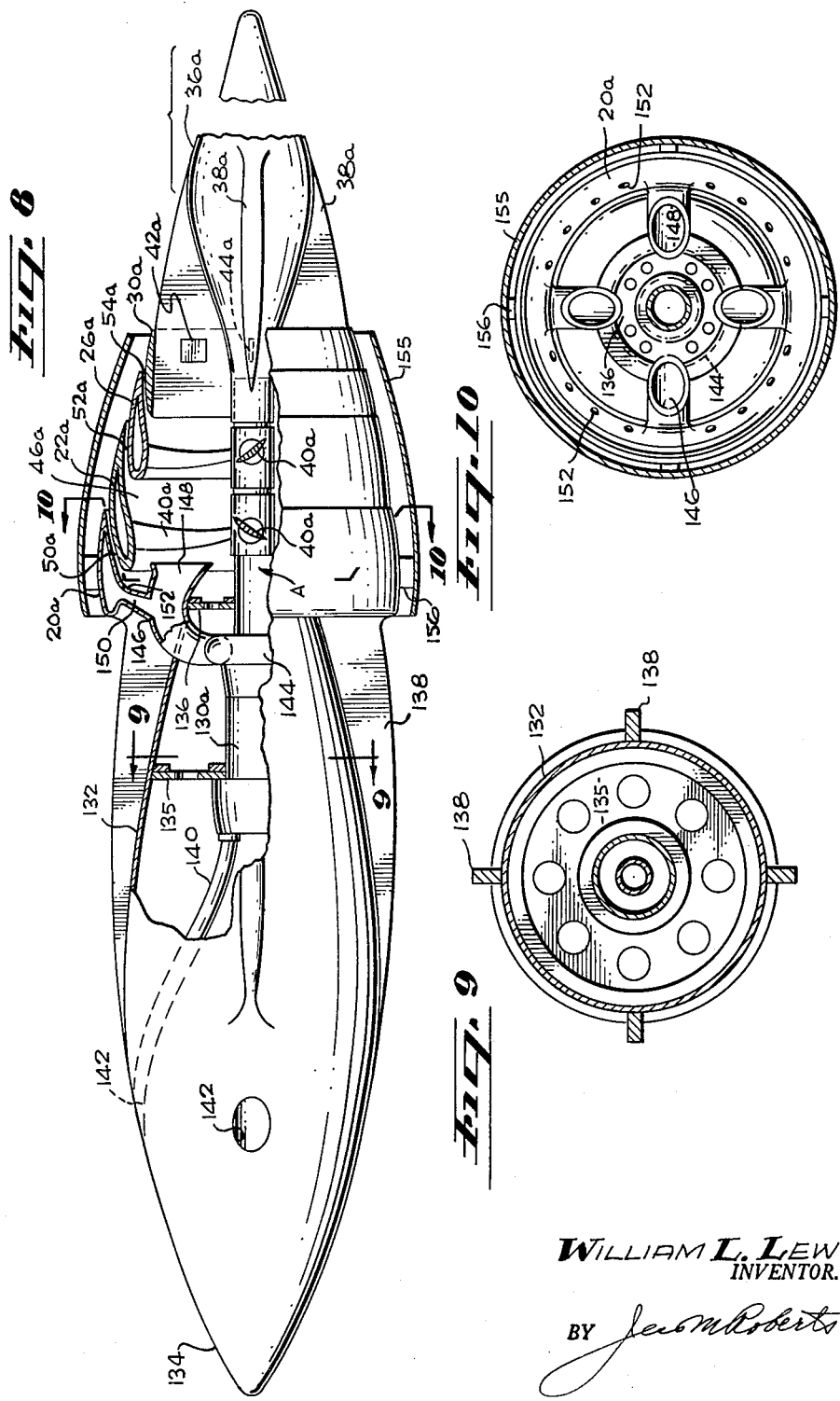
WILLIAM L. LEWIS
INVENTOR.
BY *Jesse M. Roberts*
ATTORNEY United States Patent Office 3,047,251
Patented July 31, 1962

3,047,251
AERODYNAMIC PROPULSION UNIT
William L. Lewis, Glendale, Calif.
(2038½ Griffith Park Blvd., Los Angeles 39, Calif.)
Filed July 14, 1960, Ser. No. 42,906
21 Claims. (Cl. 244—12)

This invention relates to an aerodynamic propulsion assembly for use on a vehicle. The vehicle may be designed for use as a surface vehicle, a track mounted vehicle, a vehicle suspended from a monorail, an airplane, a space vehicle, or an atmosphere re-entry unit of a space vehicle. To illustrate the principles involved, the embodiments of the invention selected for the present disclosure relate to a propulsion unit for an aerial vehicle.

The present invention is a continuation-in-part of my copending application Serial No. 431,370, filed May 21, 1954, and entitled "Airborne Vehicle," now issued as Patent 2,953,322.

The invention is characterized by the use of airfoils in the form of annular or generally cylindrical members which are concentric to a longitudinal axis and rotate about the axis. The upper portions of the annular or ring-shaped members when their axes are horizontal have the radial cross section typical of lift-producing airfoils, being of nonuniform thickness with rearward taper.

The invention is further characterized by the use of such rotary annular airfoils with provision for outward gaseous fluid flow over their leading edges from the interior of the assembly. This provision promotes laminar flow over the surfaces of the airfoils for reduction in drag. One or more such rotary airfoils may be arranged on a vehicle in various ways in various applications of the underlying principle.

In the selected embodiment of the invention the aerodynamic assembly includes a pair of the annular airfoils positioned in tandem with a small intervening gap, the two annular airfoils being rotated in opposite directions. A nonrotating leading annular member of similar configuration is positioned ahead of the first rotating airfoil and a second nonrotating trailing annular member of similar configuration follows the second rotating airfoil. The two rotating airfoils overlaps extensively and the two rotating airfoils considered separately from the fixed structure may be regarded as having a composite airfoil configuration that is slotted to promote laminar flow.

The leading stationary annular member overlaps the first rotary airfoil in the same manner that the two rotary airfoils overlap and the second rotary airfoil also overlaps the trailing fixed annular member in the same manner. By virtue of this arrangement, the whole assembly also may be regarded as a composite slotted airfoil with the leading and trailing portions of the assembly nonrotating and the two intermediate portions of the assembly rotating in opposite directions.

High velocity gaseous fluid flows axially through the aerodynamic assembly and a portion of the axial stream is diverted radially outward through each of the annular slots of the assembly. The axial fluid flow may be ram air, or propeller driven air, or airflow induced by the intake of a jet engine compressor. An important feature of one practice of the invention, however, is the use of the hot gaseous exhaust from an engine with numerous advantages including the prevention of ice formation.

The rotating annular airfoils are supported by radial spoke members and the trailing nonrotating annular member is supported by radial fin members. A further feature of the invention is the concept of using these various support members for aerodynamic purposes. In accord with this concept the radial spokes of the rotary airfoils may serve as propeller blades and the radial fin members of the trailing nonrotating annular member may be provided with variable control vanes to function in the general manner of rudders and elevators.

The mounting of a propeller inside a rotary airfoil reduces tip losses to promote propeller efficiency. The propeller blades, moreover, have a special advantage in the aerodynamic assembly in that they cause the fluid stream inside the assembly to be compressed by centrifugal force at the inner ends of the airfoil slots to cause the fluid to be ejected at high velocity through the slots.

The invention is further directed to certain structural problems that arise in placing these concepts into practice. One problem is to provide a suitable axial structure to support the two rotary annular airfoils and at least one of the adjacent nonrotary annular members. Another problem is to provide variable pitch propellers for the two rotary annular airfoils and to incorporate a suitable pitch control mechanism in the axial support structure. A similar problem is to incorporate means to control the variable vanes in the supporting fins of the trailing nonrotating annular member.

The manner in which the various problems are solved and the various advantages of the invention are achieved may be understood from the following detailed description together with the accompanying drawings.

In the drawings, which are to be regarded as merely illustrative:

FIG. 2 is a fragmentary sectional view on a larger scale of a portion of the axial support structure showing the maner in which the spokes and propeller blades of a rotary annular airfoil are mounted on the support structure;

FIG. 3 is a fragmentary side elevational view on a smaller scale of the same structure;

FIG. 8 is a view partly in section and partly in side elevation illustrating a second embodiment of the invention which utilizes exhaust gases from an engine;

FIG. 9 is a section along the line 9—9 of FIG. 8 showing a bulkhead in the structure; and FIG. 10 is a section along the angular line 10—10 of FIG. 8 showing a passage arrangement for directing the exhaust gases.

Figure 1:
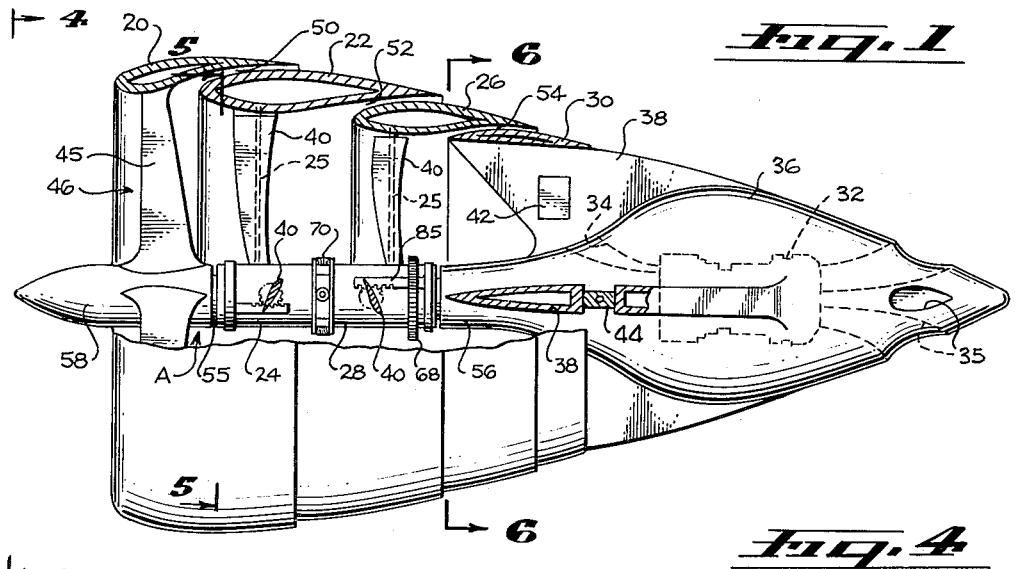
FIG. 1 is a view partly in side elevation and partly in section illustrating a selected embodiment of the aerodynamic propulsion unit or assembly.
Figure 4:
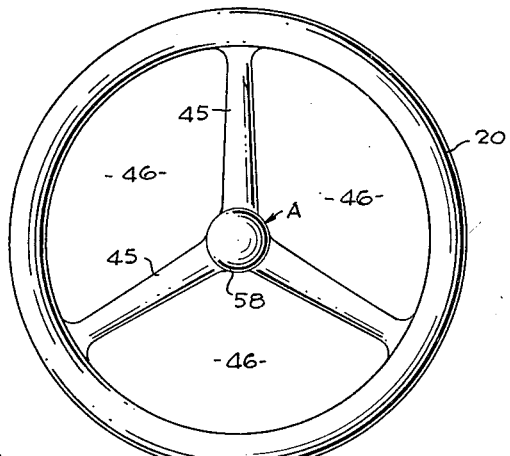
FIG. 4 is an end elevation of the assembly or unit as viewed along the line 4—4 of FIG. 1.
Figure 5:
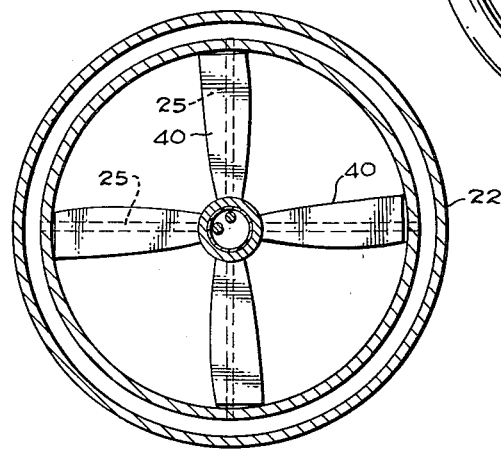
FIG. 5 is a transverse section taken as indicated by the line 5—5 of FIG. 1 showing the propeller blades mounted on the spokes of a rotary annular airfoil.

FIG. 1 exemplifying one practice of the invention shows an aerodynamic assembly which may be mounted on a vehicle in any suitable manner. For example the aerodynamic assembly may be on the fuselage proper of an aerial vehicle or may constitute a nacelle of an aerial vehicle.

Figure 7:
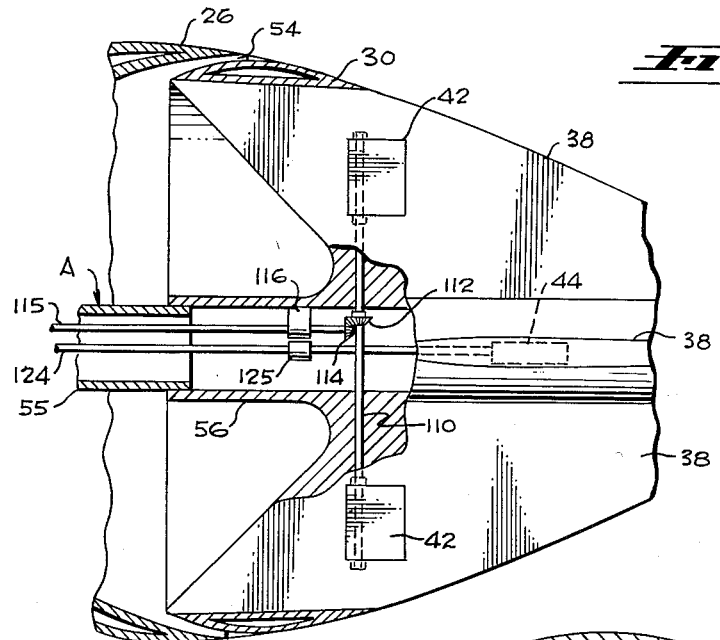
FIG. 7 is a fragmentary longitudinal section of the structure shown in FIG. 6.
Figure 6:
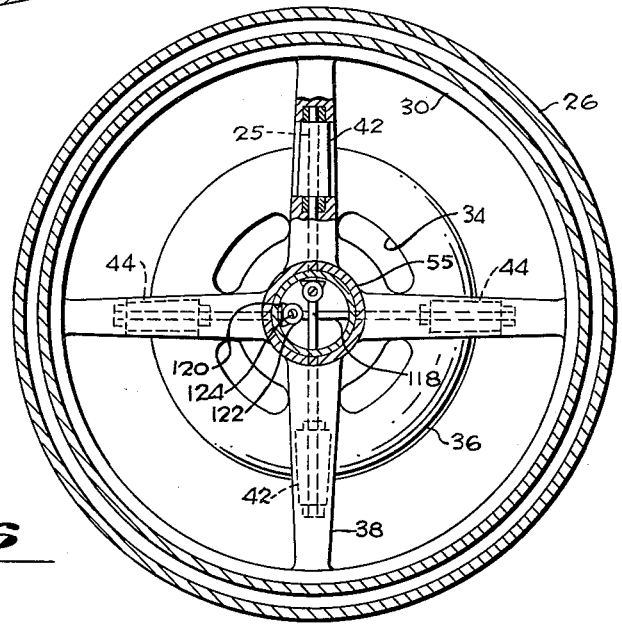
FIG. 6 is a transverse section taken as indicated by the line 6—6 of FIG. 1 showing the trailing nonrotating annular member of the assembly or unit and the trailing structure associated therewith.

The principal parts of the aerodynamic assembly include: a leading fixed annular member 20; a fixed axial support structure, generally designated by the letter A, which extends rearward from the region of the leading fixed annular member 20; a first annular rotary member 22; a first rotary hub member 24 journaled on the axial support structure A with spoke members 25 fixedly extending radially from the hub member to carry the first annular rotary member 22; a second annular rotary member 26; a second rotary hub member 28 journaled on the axial support structure A with spoke members 25 fixedly extending radially therefrom for support of the second annular rotary member 26; a trailing fixed annular member 30; a jet engine 32 with intake passage 34 and exhaust passages 35, the jet engine and its passages being incorporated in a bulbous housing 36 that constitutes the trailing end of the axial support structure A; radial fins 38 supporting the trailing fixed annular member 30 from the axial support structure A; a plurality of variable pitch propeller blades 40 journaled on the spokes 25 of the two rotary hub members 24 and 28; and airfoils incorporated in the radial fin 38, the airfoils comprising a pair of vertically aligned rudder vanes 42 indicated in FIGS. 6 and 7 and a pair of horizontally aligned elevator vanes 44 indicated in FIG. 6.

In the particular construction shown in FIG. 1, the leading fixed annular member 20 is mounted on the axial support structure A by radial struts 45 and the four annular members 20, 22, 26 and 30 define with the axial support structure an annular passage 46 that is open at both ends for the flow of gaseous fluid therethrough. In this instance, the gaseous fluid is ram air with the flow of the ram air promoted by the propeller blades 40 and by the intake of the jet engine 32.

It is apparent that the aerodynamic assembly may be mounted on a vehicle in various ways. In some instances the aerodynamic assembly may be attached to a vehicle by means of the axial support structure A. In other instances the assembly may be attached to a vehicle by means of the leading fixed annular member 20. In other instances the trailing end of a cylindrical fuselage or the like may be directly connected to the struts 45.

It is to be noted that the leading fixed annular member 20 overlaps or encloses the leading end of the first annular rotary member 22 to form therewith a discharge passage 50 which diverts gaseous fluid from the annular passage 46 across the leading edge of the rotary member 22 as well as across its outer peripheral surface. In like manner the first annular rotary member 22 overlaps the second annular rotary member 26 to form therewith a second discharge passage 52 to divert a portion of the fluid stream over the second rotary member 28. Finally, the second rotary member 26 overlaps the trailing fixed annular member 30 to form a third discharge passage 54 for diversion of a portion of the fluid over the trailing fixed annular member.

It may be seen in FIG. 1 that the two rotary annular members 22 and 26 considered apart from the fixed annular members 20 and 30 have the composite configuration of a single airfoil, the discharge passage 52 being a slot to promote laminar airflow over the peripheral surfaces of the composite airfoil. On the other hand the four annular members 20, 22, 26 and 30 have a composite airfoil configuration in which the three discharge passages 50, 52 and 54 function as slots to promote laminar fluid flow.

The axial support structure A may comprise a tubular beam 55 having a tubular extension 56. The tubular beam 55 is telescoped at its forward end into a tapered nose member 58 that is unitary with the previously mentioned struts 45.

The two rotary hub members 24 and 28 may be mounted on the tubular beam 55 in any suitable manner and may be actuated in any suitable manner. The propeller blades 40 may be mounted on the two hub members in any suitable manner under the control of any suitable pitch control mechanism.

In the construction shown in the drawings each of the rotary hub members 24 and 28 is mounted by ball bearings 60 on a cylindrical casting 62 that surrounds the tubular beam 55 and is attached thereto by suitable bolts 64.

To actuate the two rotary hubs 24 and 28, a power driven drive shaft 65 carries a gear 66 in mesh with a larger gear 68 that is unitary with one of the two hub members. Rotation is translated to the other of the two rotary hub members by a circumferential series of bevel gears 70 that are mounted on corresponding radial stub shafts 72 journaled in suitable bearings 74 on the cylindrical casting 62. The rotary hub member 24 fixedly carries a bevel gear 75 concentric thereto in mesh with the bevel gears 70 and in like manner the rotary hub member 28 carries a second bevel gear 76 in mesh with the bevel gears. By virtue of this arrangement the two rotary hub members 24 and 28 are rotated in opposite directions at equal rates.

Each of the spoke members 25 is mounted radially in the corresponding rotary hub member 24 or 28 and may be secured therein by welding as indicated at 78 in FIG. 2. Each of the spoke members 25 extends through a corresponding gear housing 80 that is integral with the rotary hub member, the gear housing being of open construction and having an outer wall with a circular opening 82 concentric to the spoke member. Each of the propeller blades 40 is rotatably mounted on the corresponding spoke member 25 for pitch variation with the root of the propeller blade journaled in the gear housing opening 82 and keyed to a gear 84 inside the housing.

Adjacent each of the gear housings 80 and in sliding contact with a pair of guide elements 81 (FIG. 3) is a rack arm 85 in mesh with the corresponding gear 84 to control the pitch of the corresponding propeller. The four circumferentially spaced rack arms 85 for controlling each of the set of four propeller blades 40 are integral arms of an axially slidable ring 86 that is formed with a radial flange 88.

Associated with each of the two slidable rings 86 is an adjacent nonrotating control sleeve 90 which encloses the radial flange 88 as shown in FIG. 2. The control sleeve 90 confines the radial flange 88 between two sets of bearing balls 92 to permit freedom for rotation of the slidable ring 86 relative to the control sleeve. Each of the two control sleeves 90 for the two sets of propeller blades is formed with an inner circumferential screw thread 94 which is engaged by an outer screw thread 95 of a corresponding adjustment sleeve 96. Each adjustment sleeve 96 is mounted on the cylindrical casting 62 by bearing balls 98 and is rotationally adjustable by remote control. In the construction shown each adjustment sleeve 96 is formed with inner circumferential gear teeth 100 which are engaged by a corresponding pinion 102 on a corresponding pitch-control shaft 104.

It is essential that a control sleeve 90 be free for axial movement but be prevented from rotating. To prevent rotation of each control sleeve 90, a radial pin 105 is fixedly mounted in the cylindrical casting 62 and extends into a longitudinal slot 106, the slot cutting across the screw thread 94 on the inner circumference of the control sleeve.

The two pitch-control shafts 104 may be rotated by remote control in any suitable manner. For example each of the shafts 104 may be actuated by a corresponding motor 108, the two motors being shown in FIG. 3.

The manner in which the rudder vanes 42 and the elevator vanes 44 may be controlled is indicated in FIGS. 6 and 7. The two rudder vanes 42 are fixedly mounted on a vertical shaft 110 that is journaled in a pair of diametrically opposite fins 38. A bevel gear 112 that is keyed to the vertical shaft 110 meshes with a second bevel gear 114. The second bevel gear 114 is keyed to a control shaft 115 that is journaled in suitable bearings 116 inside the tubular beam 55 and inside the tubular beam extension 56.

In like manner the two elevator vanes 44 are mounted on a horizontal shaft 118 that is journaled in the other pair of diametrically opposite fins 38. A bevel gear 120 keyed to the horizontal shaft 118 meshes with a bevel gear 122 on a control shaft 124. The control shaft 124 is mounted in suitable bearings 125 inside the tubular beam 55 and inside the tubular extension 56. The two control shafts 115 and 124 extend forward through the tapered nose member 58 and may be actuated by remote control in any suitable manner.

The described aerodynamic assembly is effective for producing lift when inclined to provide an angle of attack and especially the two annular rotary airfoils 22 and 26. The high velocity flow of air through the annular passage is an important factor in producing lift and the outward diversion of the airflow through the discharge passages 50, 52 and 54 minimizes the drag involved by promoting laminar airflow over the outer aerodynamic surfaces.

The high velocity fluid flow through the annular passage 46 and out through the three annular discharge passages 50, 52 and 54 under the propulsion of the propellers 40 produces lifting force without the necessity of forward motion of the aerodynamic assembly. Engine thrust is present but is minimum when forward speed is nil and the propellers 40 are in flat pitch. To exert maximum lift at zero forward speed, it may be desirable in some instances to anchor the vehicle against forward motion with freedom for the vehicle to rise and then when the vehicle rises to a desired height to release the vehicle for forward motion free from ground friction. The forward motion of the vehicle may be controlled by changing the pitch of the propellers 40. As forward speed increases, engine thrust power increases to result in added lift and consequent increase in climb to permit rapid vertical acceleration within short horizontal distances.

With lifting force produced by merely rotating the annular airfoils 22 and 26, forward motion of the vehicle may be braked or slowed by changing the propeller blades to flat pitch so that the vehicle may hover or may slowly descend in a relatively small area. Landing speed may be effectively braked the same way even before the vehicle touches the ground.

The second embodiment of the invention shown in FIGS. 8 to 10 is largely similar to the first embodiment as indicated by the use of corresponding numerals to indicate corresponding parts. Thus, the second embodiment has the previously described aerodynamic assembly including a fixed annular member 20a, a first rotary annular member 22a, a second rotary annular member 26a and a trailing fixed annular member 30a. The two annular rotary members 22a and 26a are provided with the usual variable propeller blades 40a which are mounted on the usual radial spokes (not shown). The four radial fins 38a that support the trailing fixed annular member 30a are provided with the usual pair of rudder vanes 42a and the usual pair of elevator vanes 44a.

The aerodynamic assembly includes the usual axial support structure A and the rear end of this axial support structure has the usual bulbous extension or housing 36a but in this instance no jet engine is incorporated in the bulbous housing. Included in the axial support structure A as an integral forward extension thereof is a jet engine 130.

Extending forward from the aerodynamic assembly and fixedly connected thereto is a streamlined shroud or housing 132 which is tapered in both longitudinal directions and forms a forward tapered nose 134. The shroud 132 is rigidly connected to the axial support structure A by a forward apertured bulkhead 135 and a similar rearward apertured bulkhead 136. The shroud 132 is formed with four diametrically opposite longitudinal fins 138 that extend radially outward from the shroud and are faired into the leading fixed annular member 20a. The shroud 132 may be a fuselage, a compartment for personnel, or a warhead if the vehicle is a missile.

The jet engine 130 has four forwardly extending intake ducts 140 that terminate in forward intake ports 142 in the shroud 132. The hot gases from the jet engine 130 exhaust into a collector ring 144. From the collector ring 144 the hot exhaust gases flow into four exhaust ducts 146 which enter the four longitudinal fins 138 respectively and terminate in four corresponding exhaust nozzles 148 which are directed rearwardly into the annular space 46a.

The forward fixed annular member 20a is hollow and is supplied with the hot exhaust gases by four radial branch ducts 150 from the four respective exhaust ducts 146. Numerous small apertures 152 in the inner wall of the forward fixed annular member 20a and in the four branch ducts 150 release jets of the hot gases in the region of the forward annular discharge passage 50a.

This second embodiment of the invention functions in the same general manner as the first embodiment. Ram air enters the annular passage 46a alongside the four longitudinal fins 138 and mixes with the hot exhaust gases that are released by the four exhaust nozzles 148 and the numerous apertures 152.

The hot exhaust gases inside the forward fixed annular member 20a keep the peripheral surface of that member from icing. The hot gases that are released by the apertures 152 in the region of the first annular discharge passage 50a flow over the peripheral surface of the first annular rotary member 22a to keep that member from icing. In like manner the hot exhaust gases that are diverted from the annular space 46a outward through the second annular discharge passage 52a prevent icing of the second annular rotary member 26a and the hot gases that are diverted outward through the third annular discharge passage 54a prevent icing of the trailing fixed annular member 30a. The de-icing function of the hot gaseous flow through the annular discharge passages 50a, 52a and 54a is in addition to the function of promoting laminar airflow over the two annular rotary members 22a and 26a as well as over the trailing fixed annular member 30a.

FIGS. 8 and 10 further illustrate the fact that an outer shroud or cowling 155 may be added in some practices of the invention. The shroud 155 is in the form of a shell of curved profile for aerodynamic effect and is attached to the fixed structure in radial spacing thereto by short radial struts 156.

Applying such a shroud or cowling, in the form of a hollow cylinder, the outer contour of which conforms to the curvature of an aerodynamic lifting surface, to the outer diameter of the rotatable and fixed lifting surfaces in FIG. 8, provides a lifting force when the vehicle is inclined at an angle of attack in forward motion at high supersonic speed. At extremely high altitude where supersonic aircraft operate at best efficiency, the low density air is not a suitable medium for using propellers. Propellers work best in high density air at ground level, consequently in taking off, the propellers in combination with the rotating lifting surfaces produce forces which cause the aircraft to lift from the ground and to attain forward motion in flight.

When the desired altitude for most efficient supersonic flight is reached, the propellers are feathered (blades turned parallel to line of flight) after being disengaged from the engine drive. The jet engine thrust, which is present whether the propellers are engaged or not, is used in maintaining forward motion.

The shroud is spaced away from the outer diameter of the rotatable surfaces, to provide an annular space for the passage of a portion of the slipstream. This portion of the slipstream combines with a portion of the exhaust gases and/or the high velocity air passing through the annular discharge passage between the annular members and is discharged into the airstream passing over the shroud's outer surface.

My description in specific detail of the selected embodiments of the invention will suggest various changes, substitutions and other departures from my invention within the spirit and scope of the appended claims.

I claim:

1. In an aerial vehicle: a fixed axial support structure; a ring member rotatably supported on the axial structure at radial spacing therefrom with the outer periphery of the ring member exposed to the environment of the vehicle, the upper portion of said ring member when the axis thereof is horizontal having the radial cross-sectional configuration of a lift-producing airfoil of nonuniform thickness with a rearward taper; and power means to rotate the ring member relative to the fixed axial structure.

2. A combination as set forth in claim 1 which includes a plurality of power-driven propeller blades extending across the radial space between the fixed axial structure and the ring member.

3. A combination as set forth in claim 2 in which the propeller blades are variable pitch blades; and which includes means to vary the pitch of the propeller blades by remote control.

4. A combination as set forth in claim 3 in which said ring member has a plurality of radial support spokes; and in which said plurality of propeller blades are rotatably mounted on the spokes respectively.

5. A combination as set forth in claim 1 which includes means to direct a stream of gaseous fluid through said ring member and radially outward across the leading edge of the ring member.

6. A combination as set forth in claim 1 which includes a fixed shroud enclosing said ring member, said shroud being open at both ends and being spaced radially from the ring member to form therewith an annular passage for a portion of the slipstream.

7. An aerodynamic assembly for a vehicle comprising: a fixed axial support structure; a first rotary annular member power actuated for rotation in one direction; a second adjacent concentric rotary annular member power actuated for rotation in the opposite direction, said two rotary annular members being mounted on said fixed axial structure concentrically thereof at radial spacing therefrom to form therewith an annular passage for gaseous fluid flow therethrough, the upper portion of each of said annular members when the axis thereof is horizontal having the radial cross-sectional configuration of a lift-producing airfoil of nonuniform thickness with a rearward taper, the tapered trailing portion of said first rotary member being adjacent and overlapping the leading end of said second rotary member to form therewith a rearwardly directed annular passage for outward diversion of a portion of the gaseous fluid over the leading end and over the peripheral surface of said second rotary member.

8. A combination as set forth in claim 7 which includes means to direct a hot gaseous fluid into the annular passage defined by the fixed axial structure and the two rotary annular members.

9. A combination as set forth in claim 7 which includes propeller blades inside the annular space defined by the fixed annular structure and said first and second rotary annular members.

10. A combination as set forth in claim 9 in which each of said rotary annular members is supported by radial means rotating therewith; and in which the propeller blades are rotatably mounted on said radial means.

11. A combination as set forth in claim 7 which includes a fixed shroud enclosing said first and second rotary members, said shroud being open at both ends and being spaced radially from the rotary members to form therewith an annular passage for a portion of the slipstream.

12. An aerodynamic assembly for a vehicle comprising: a leading fixed annular member; a first rotary annular member power actuated for rotation in one direction; and a second rotary annular member power actuated for rotation in the opposite direction, the upper portion of each of said three annular members when the axis thereof is horizontal having the radial cross-sectional configuration of an airfoil of nonuniform thickness with a rearward taper, the tapered trailing portion of said fixed annular member enclosing the leading end of said first rotary member to form therewith a first discharge passage for outward flow of gaseous fluid, the tapered trailing portion of said first rotary member enclosing the leading end of said second rotary member to form therewith a second discharge passage for outward flow of gaseous fluid.

13. A combination as set forth in claim 12 which includes means for directing hot gaseous fluid into the interior of said three members for outward diversion through said discharge passages.

14. An aerodynamic assembly for a vehicle, comprising: a leading fixed annular member; a first rotary annular member power actuated for rotation in one direction; a second rotary annular member power actuated for rotation in the opposite direction; a fixed trailing annular member; and a fixed axial structure extending through said annular members and forming therewith an annular passage for fluid flow, the upper portion of each of said rotary annular members when the axis thereof is horizontal having the radial cross-sectional configuration of an airfoil of nonuniform thickness with a rearward taper, said leading fixed annular member enclosing the leading end of said first rotary member to form therewith a first discharge passage for diversion of the fluid, the tapered trailing portion of said first rotary member enclosng the leading end of said second rotary member to form therewith a second discharge passage for diversion of a portion of the fluid, the tapered trailing portion of said second rotary member enclosing the leading end of said trailing fixed member to form therewith a third discharge passage for diversion of a portion of the fluid.

15. A combination as set forth in claim 14 which includes propeller blades in said annular passage to promote the flow of gaseous fluid therethrough.

16. A combination as set forth in claim 14 which includes remotely controlled vanes in said annular passage in the region of said trailing fixed annular member for directional control.

17. A combination as set forth in claim 14 which includes a jet engine mounted on said axial support structure rearward of the two rotary annular members to promote the flow of gaseous fluid through said annular passage.

18. A combination as set forth in claim 14 in which said rotary annular members are supported by radial supports that rotate therewith; and which includes propellers of variable pitch under remote pitch control, said propellers being rotatably mounted on said radial supports.

19. An aerodynamic assembly for a vehicle, comprising: a leading fixed annular member; a first rotary annular member power actuated for rotation in one direction; a second adjacent rotary annular member power actuated for rotation in the opposite direction, the upper portion of each of said two rotary annular members when the axis thereof is horizontal having a radial cross-sectional configuration of an airfoil of nonuniform thickness with a rearward taper; a fixed axial support structure extending along the axis of said members to form therewith an annular passage for fluid flow, said leading fixed annular member overlapping the leading portion of said first rotary annular member to form therewith a discharge passage for diversion of the fluid from said annular passage, the tapered trailing portion of said first rotary member enclosing the leading end of said second rotary member to form therewith a second discharge passage for diversion of fluid from said annular passage; and means to direct a stream of gaseous fluid into said annular passage.

20. A combination as set forth in claim 19 which includes means to direct hot gaseous fluid into said annular passage and into said first discharge passage.

21. A combination as set forth in claim 19 in which said last-mentioned means includes passage means extending through said fixed annular member.

(References on following page)

References Cited in the file of this patent

UNITED STATES PATENTS

| | | |
|---|---|---|
| 1,772,049 | Lake | Aug. 5 1930 |
| 1,820,467 | Liska | Aug. 25, 1931 |
| 1,954,437 | Washburne | Apr. 10, 1934 |
| 2,041,789 | Stalker | May 26, 1936 |
| 2,360,982 | Sahle | Oct. 24, 1944 |
| 2,874,920 | Mallinckrodt | Feb. 24, 1959 |
| 2,953,322 | Lewis | Sept. 20, 1960 |

FOREIGN PATENTS

| | | |
|---|---|---|
| 20,530 | Great Britain | of 1909 |
| 726,969 | Germany | Oct. 23, 1942 |
| 578,534 | Great Britain | July 2, 1946 |
| 647,749 | Great Britain | Dec. 20, 1950 |
| 652,083 | Great Britain | Apr. 18, 1951 |